March 26, 1946.  J. M. HAIT  2,397,105
CHAIN MECHANISM
Filed March 4, 1943  3 Sheets-Sheet 1
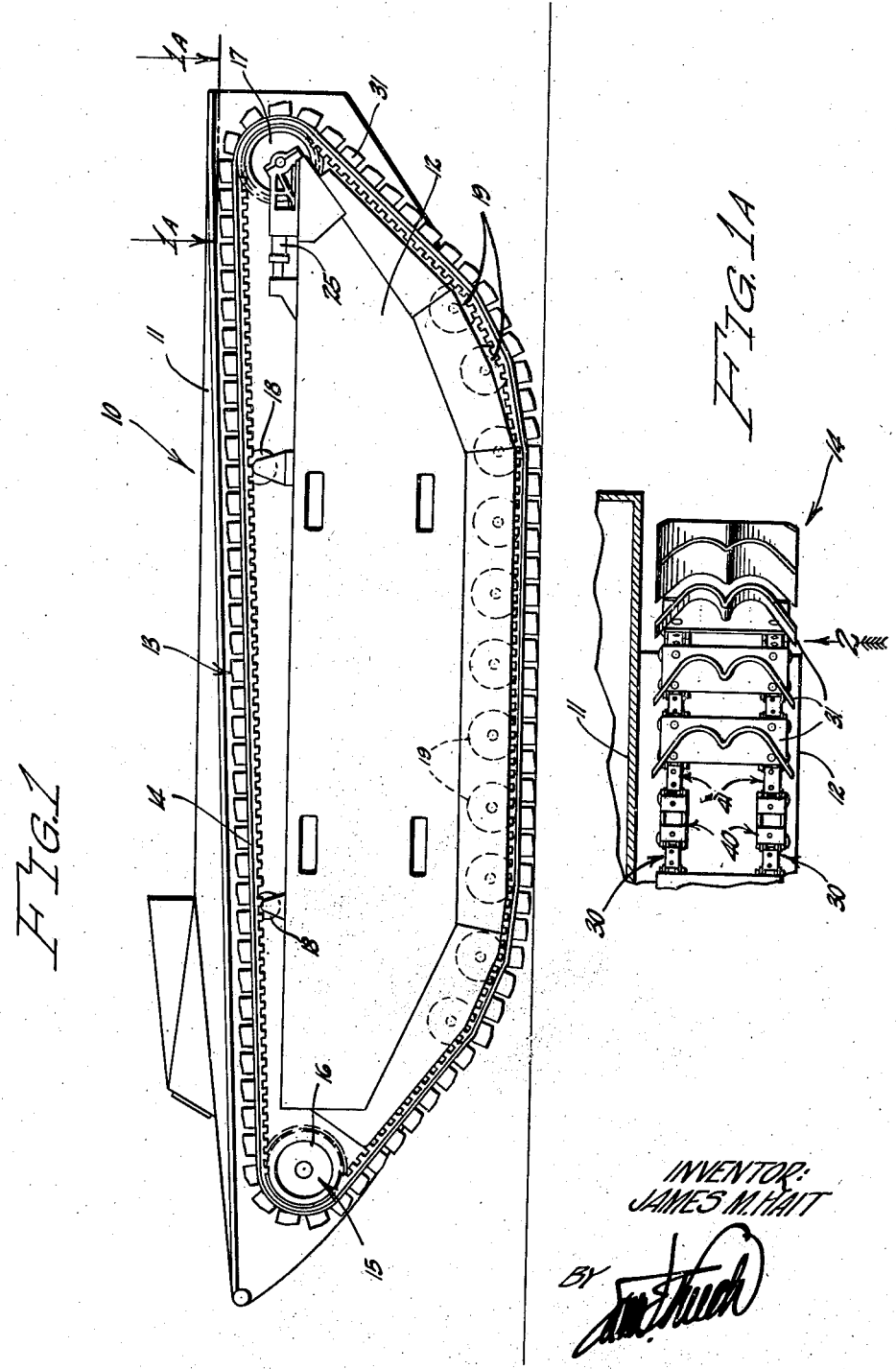
INVENTOR:
JAMES M. HAIT
BY
ATTORNEY

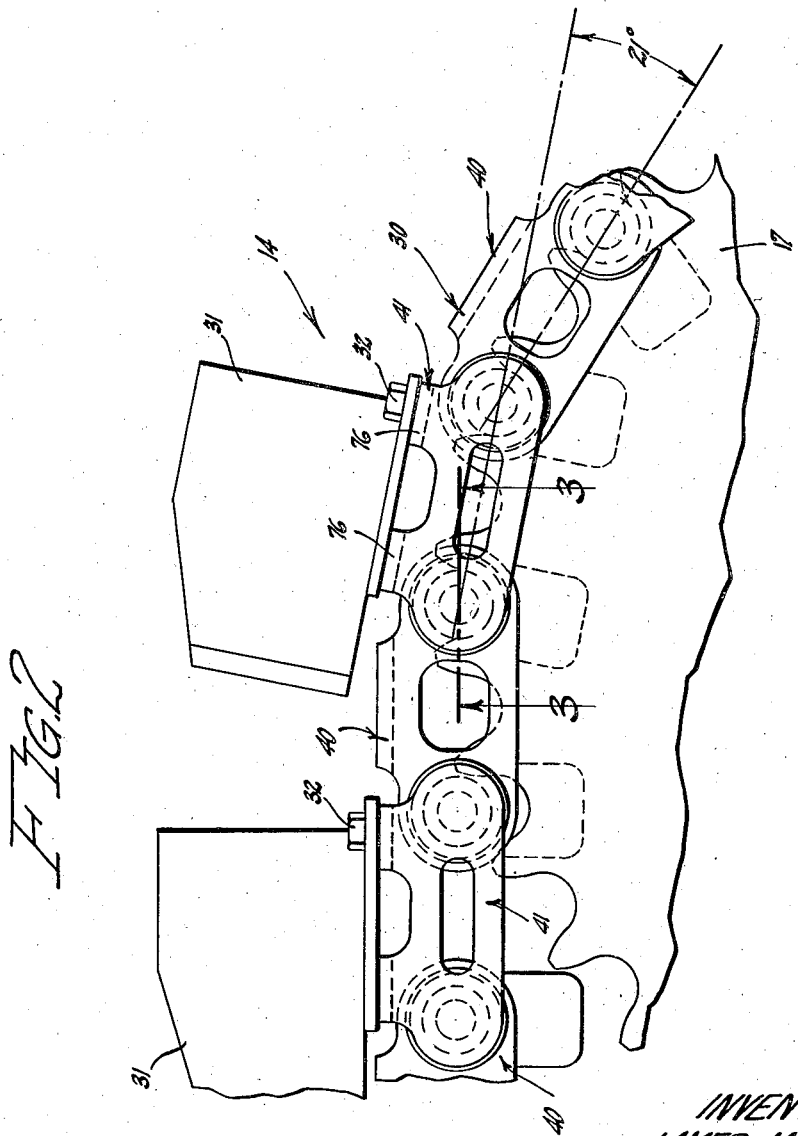

March 26, 1946.    J. M. HAIT    2,397,105
CHAIN MECHANISM
Filed March 4, 1943    3 Sheets-Sheet 3
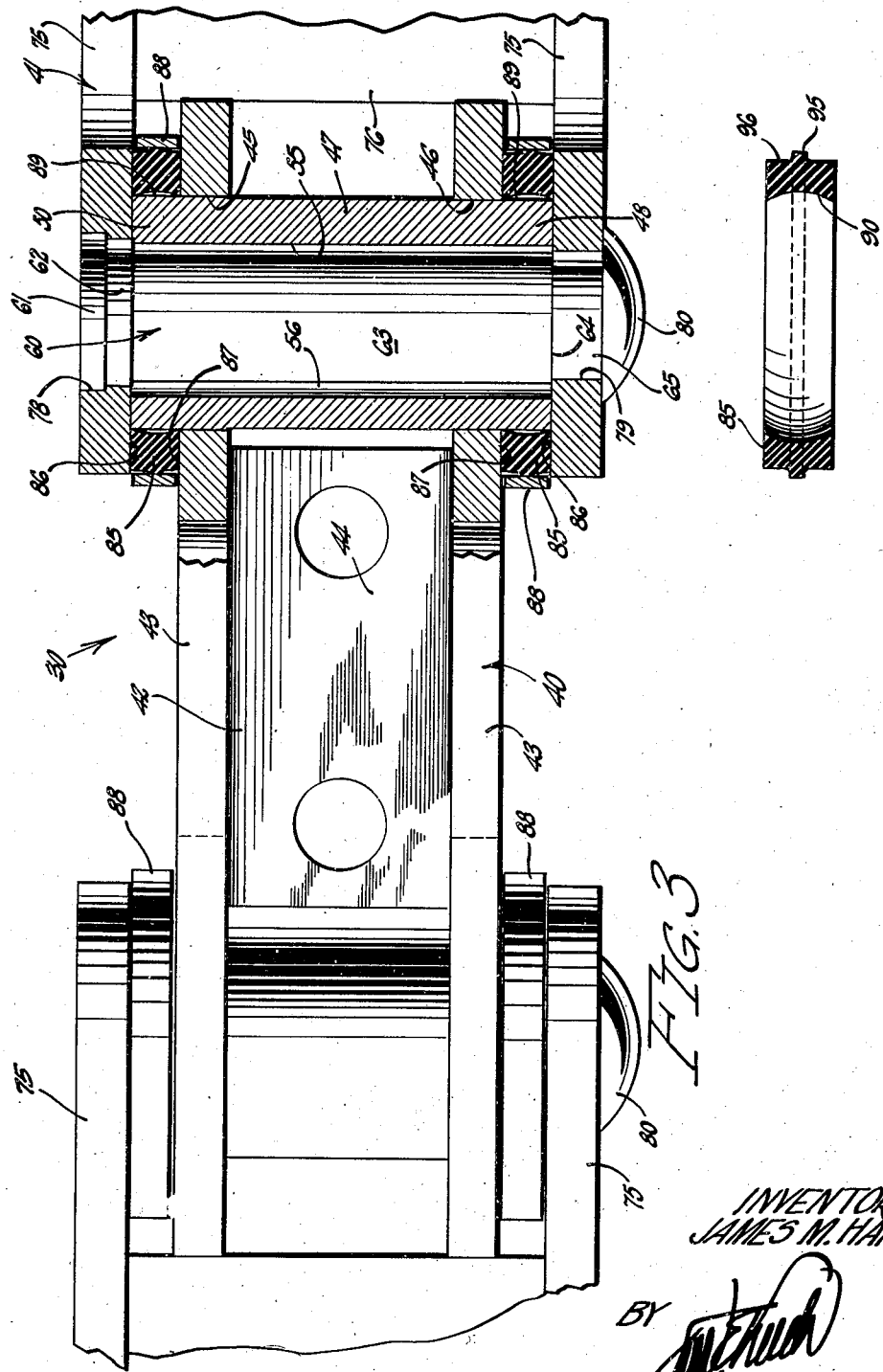

Patented Mar. 26, 1946

2,397,105

UNITED STATES PATENT OFFICE 2,397,105

CHAIN MECHANISM

James M. Hait, San Gabriel, Calif., assignor to Food Machinery Corporation, San Jose, Calif., a corporation of Delaware Application March 4, 1943, Serial No. 477,937

2 Claims. (Cl. 305—10)

This invention relates to chain mechanisms, and is particularly useful in the track-laying mechanisms employed on tractors, military tanks and amphibians.

One of the principal problems met with in the operation of track-laying mechanisms on the types of vehicle aforementioned, is that of insuring continued lubrication of the chain bearings over long operating periods, and to prevent access thereto by foreign matter, and particularly abrasives which would quickly wear these bearings out.

It is an object of my invention to provide a chain mechanism in which the lubrication of the chain bearings is maintained, and access of foreign matter to said bearings is prevented over long operating periods.

The manner of accomplishing the foregoing object as well as further objects and advantages, will be made manifest in the following description taken in connection with the accompanying drawings, in which:

Fig. 1 is a side elevation of an amphibian equipped with track-laying belts and means for mounting the same on said amphibian in which is incorporated a preferred embodiment of my invention.

Fig. 1A is a fragmentary enlarged plan view of a portion of a track-laying belt of the invention with one grouser thereof removed to illustrate the chains thereof.

Fig. 2 is an enlarged fragmentary side elevational view of a section of the chain of my invention associated with a sprocket thereof, this view being taken in the direction of arrow "2" in Fig. 1A.

Fig. 3 is an enlarged detail view of the aforesaid chain including a section of one of the bearings thereof, taken on the line 3—3 of Fig. 2.

Fig. 4 is a cross sectional view of the preferred form of rubber sealing ring employed in my invention.

Referring specifically to the drawings, an amphibian 10 is shown in Fig. 1, having a hull 11, opposite sides of which are provided with pontoons 12, on which are mounted chain mechanisms 13 of my invention. Each of these mechanisms include an endless track-laying belt 14, and guide means 15 therefor, which includes a drive sprocket 16, an idle sprocket 17, idle rollers 18 mounted on top of the adjacent pontoon 12, and a series of bogie wheels 19 provided on the bottom of said pontoon. The idle sprocket 17 has a jack 25 by which the track-laying belt 14 may be tightened after it has been trained about the various elements of the guide means 15.

Fig. 2 is an enlarged-scale representation of a portion of the sprocket 17, with a section of the track-laying belt 14 trained thereabout. Each of the sprockets 16 and 17 is a double sprocket and the track-laying belt 14 includes two identical endless chains 30 which are united by an endless series of grousers 31, secured to the chains by bolts 32.

As shown in Figs. 2 and 3, each chain 30 includes inside or bearing links 40 and outside or plate links 41. Each bearing link 40 includes a channel shaped body 42, having side walls 43 joined by a back plate 44, opposite ends of the side walls extending beyond said plate and having co-axial openings 45 and 46. Driven into these openings is a bearing sleeve 47, end portions 48 of which extend outwardly from the openings 45 and 46. The opening 45 is slightly larger than opening 46 and the sleeve 47 is made to fit both openings as shown in Fig. 3. This makes one of the sleeve ends 48 slightly larger in diameter than the other, but this difference is so small as to be of no consequence to the operation of the invention.

The sleeve 47 has a journal bore 55, in which is a lubricant groove 56. Journalling in this bore is a link pin 60 of an adjacent link 41. The pin 60 preferably has a head 61, with a shoulder 62 formed between this head and the shank 63 of the pin. This shank is turned down towards the opposite end of the pin to provide a shoulder 64 and a pin end section 65.

Each link 41 includes side plates 75 which are formed integral with and united by back straps 76, upon which the grousers 31 are mounted. The side plates 75 overlie the end portions 48 of the bearing sleeve 47, as shown in Fig. 3 and have concentric openings 78 and 79 which are concentric with the journal bore 55 of the sleeve 47 when the chain is assembled. The pin head 61 and shoulder 62 fit into the opening 78 and the pin end section 65 of the pin fits into the opening 79 in the other side plate 75. The pin end is then swedged to form a rivet head 80 thereon which permanently assembles the chain.

When assembling the chain 30, I prefer to place rubber rings 85 in the annular spaces about end portions 48 of bearing sleeve 47, between opposed radial faces 86 and 87 of the plates 75 and walls 43. Although not essential, I also prefer to provide flat metal bands 88 so that one of these surrounds each of the rings 85 and protects this ring from sharp rocks and the like.

While the flexible rings 85 may vary considerably in material and design they are preferably molded out of soft rubber or a rubber substitute as shown in Fig. 4. The term "rubber" may be used to cover all suitable rubber-like materials. I have found synthetic rubber especially suitable for these rings as it is unaffected by the lubricant with which the chain bearings are filled when the chain is assembled. A durometer hardness of about 30 is preferable to give the necessary degree of flexibility to these rings 85 in the specific combination illustrated.

As molded, the ring 85 has an inside diameter which preferably just fits the end portions 48 of the bearing sleeve 47, so that these rings are always assembled concentrically with the bearing sleeve. Figs. 3 and 4 are to the same scale, so that it can be seen that the ring 85 is preferably molded with an axial dimension which is one and one-third times as great as that of the annular space into which it is compressed when the chain is assembled.

The reason for this is that it is highly desirable that continuous pressure exist between each rubber ring 85 and the radial faces 86 and 87 on the walls 43 and plates 75. This pressure sets up a friction between the ring and these faces so that when the chain 30 is flexed by rotating one link 40 relative to an adjacent link 41, there will be no slippage between the rings 85 and the radial faces 86 and 87 engaged thereby, until the internal tension set up in any ring 85 is such as to exceed the friction between this ring and one of the adjacent surfaces 86 and 87.

I have discovered that it is possible, by using relatively short links in the chains 30 and relatively large sprockets such as the sprockets 16 and 17, upon which these chains are trained, to reduce the maximum amount of flexing to which the chain is subjected, so that suitably designed rubber rings 85 will remain at all times in sealing engagement with the faces 86 and 87 and will not slip relative thereto. I have thus produced a chain mechanism, the bearings of which are sealed at both ends so that no grease may escape therefrom, thereby assuring that these bearings will be lubricated for an indefinite period of use without attention, and also insuring that this bearing will, for the same period, remain in good operating condition by completely excluding foreign matter, and particularly abrasives, from having access to the chain bearings.

While, as stated above, there is some latitude in the design of flexible rings 85 employed in the chain mechanism of my invention, the design of this ring disclosed herein has special merits which are being covered in my co-pending application for U. S. Letters Patent, Serial No. 477,938 and filed herewith.

Being pressed together, the link body 42 and the bearing sleeve 47 have no movement relative to each other after being assembled. I have discovered that any pressure between a flexible ring 85 and a cylindrical face 89 of the bearing sleeve directly therewithin tends to thwart the twisting action of the material within the ring 85 and thus to decrease the amount of flexing in the link joints which is possible without causing slippage between the rubber rings 85 and one or both of the surfaces 86 and 87. I therefore practically eliminate all friction between each ring 85 and the adjacent cylindrical surface 89 by forming these rubber rings with a concave inner face 90 which is channelled deeply enough so that when the chain is assembled as shown in Fig. 3 and these rings considerably compressed axially, the inner face 90 of each ring is still arched slightly away from the cylindrical bearing sleeve surface 89 adacent thereto.

In order to leave the axially opposite portions of each ring 85 which contact the surfaces 86 and 87 free to move with these surfaces when the chain is flexed, I also find it advantageous to adopt measures to prevent the metal band 88 from frictionally engaging both of these portions of the ring 85. This I accomplish by making the metal band 88 with an inside diameter which is substantially larger than the outside diameter of said axially opposite portions of the ring 85. In some cases I have found it suitable to form the ring 85 with a cylindrical outer face so that when it is compressed in the assembly of the chain 30, as shown in Fig. 3, the outer surface of the ring 85 has a convex arcuate cross section which just contacts the encircling band 88 along a narrow path disposed midway between its opposite edges. To insure uniformity in the contact between the rubber ring 85 and the encircling metal band 88, however, I prefer to form an annular bead 95 extending outwardly from the exterior cylindrical surface 96 of the ring 85 in a plane midway between opposite end faces of the ring. As shown in Fig. 3, the bead 95 is compressed against the band 88 adjacent thereto when the chain is assembled. Each band 88 is thus suspended in a position to float with respect to the adjacent wall 43 and plate 75, as well as with respect to those portions of the ring 85 which contact said wall and said plate. In other words, the band 88 rotates with the bead 95 with respect to both the adjacent wall 43 and plate 75, and in nowise interferes with the flexing of the central portion of the ring 85 which enables a non-slipping engagement between the rubber ring 85 and the surfaces 86 and 87 to be maintained.

I have found that the benefits of the present invention can be practically obtained while using the ring 85, as shown in Figs. 3 and 4 and above described, where the maximum flexure permitted between adacent chain links is approximately 21 degrees. As the maximum flexure in the track-laying belt 14 occurs where this passes around sprockets 16 and 17, the diameter of these sprockets and the pitch length of the chain employed must be selected so as not to produce a flexure in excess of this angle. This is accomplished in the illustrated embodiment by using "extended-pitch-length" chain for the chains 30 with a pitch length of 4 inches and then giving each of the sprockets 16 and 17 thirty-four teeth. Thus adjacent pins in the chains 30 extend over two teeth in each of the sprockets 16 and 17 when the chain is passing therearound so that these sprockets are equivalent to 17-toothed sprockets.

It is to be understood that to permit a 21° flexing movement between adacent links without slippage, it is only necessary that the seal ring endure an internal twisting of about 11°. The reason for this is that when the chain links are in alignment, as shown in the upper run of the belt 14 in Fig. 1, the seal rings 85 may be internally twisted 10½° in one direction from neutral, whereas these same rings where they pass around the sprockets 16 and 17, may be twisted back to neutral and then 10½° in the opposite direction from neutral.

Though for illustrative purposes I have disclosed my invention as embodied in a chain mechanism in which the flexible sealing rings have specific characteristics particularly as to elasticity of the material thereof and the degree of compression under which they are held and in which provision is made for operating the endless chains in said mechanism within a certain maximum angle of flexure, it is to be understood that the characteristics of the ring and the maximum angle of flexure aforesaid are correlative factors in the invention and each may vary within limits if suitable adjustment is made therefor in the others.

Where the invention is used on an amphibian the maximum angle of flexure is generally determined by the chain pitch length and the diameter of the drive and idle sprockets at opposite ends of the amphibian. In such a case there are four correlative factors vital to the proper operation of the invention, to-wit: the degree of elasticity of the rubber in the sealing rings, the degree of compression under which these rings are held, the pitch length of the chains, and the diameter of the amphibian idle and drive sprockets. It is to be noted, of course, that a chain such as that of my invention may be flexed by any suitable guide about which the chain passes, all rotating guides such as sprockets, bogie wheels and the like, being classifiable as rolls. Other non-rotating guides might also be employed to effect changes in direction of the chain causing flexure between adjacent links such as is involved in the operation of the present invention. Such guides might be in the form of fixed tracks, although no such tracks are employed on the amphibian 10.

Another important feature of my invention is that while slippage between the rings 85 and the radial link faces between which this is compressed, is prevented under normal operation of the amphibian 10 equipped with the invention, these rings are adapted to slip relative to said links when the latter are flexed relative to each other through an excessive angle. This is important, in that the links of the chain 14, for the most part, are permanently riveted together and these chains have to be removed at repair shops where the amphibians 10 are reconditioned from time to time during their useful life. When these chains are removed they are generally coiled up for compact storage, and a good many of the chain links on the inside of the coil are flexed at relatively sharp angles relative to adjacent links. If it were not for the fact that the rings 85 of my invention would slip relative to the radial link faces between which these are compressed when the links are thus flexed, it is probable that these rings would be damaged so that in subsequent use of the chains 14 they would not protect the link bearings and thus would cause failure of the chain and the amphibian equipped therewith.

When assembling the chain 30 the lubricant grooves 56 are, of course, packed with grease or other suitable lubricant. In one method of assembly the plates 75 are sprung apart by a jack in order to admit adjacent link ends equipped with the rings 85 and bands 88 in between these plates, after which the jack is relaxed, allowing these plates to spring inwardly and compress the rings 85 as shown in Fig. 3. Pins 60 are then inserted in place and riveted to complete the assembly of the chain. In another method of assembly the ends of links 40 when equipped with rings 85 and bands 88 are inserted in between the plates 75 without expanding these, and shims with plenty of grease are employed to facilitate this. The shims are then withdrawn and the pins 60 inserted and riveted to complete the assembly.

In the assembly of the chain 40 by either of the above methods, grease is sometimes left between the rings 85 and the surfaces 86 and 87, between which they are compressed. This grease causes slippage between the rings 85 and these surfaces until the pressure between the rings and these surfaces finally expels this grease. Friction then develops between the rings 85 and the surfaces 86 and 87, which causes these rings to operate in the normal manner hereinabove described.

The flexing or twisting of the rings 85 on opposite sides of neutral without slippage between these rings and the surfaces 86 and 87 is the natural mode of operation of the invention, and does not require any special assembly of the chain 40 to accomplish this. The capacity for flexure of adjacent links in the chain 40 equipped with my invention is therefore, of course, equal to twice the angle of flexure in one direction from neutral through which the friction between the ring 85 and the surfaces 86 and 87 will prevent slippage.

Thus it is seen that I have provided a chain mechanism having the extremely important quality of remaining lubricated, and from which abrasives are excluded over indefinite periods of use without this mechanism requiring attention. While this invention is important in many fields, it is of tremendous value at the present time in increasing the serviceability and dependability of our war equipment.

I claim:

1. An endless track mechanism for track-laying type vehicles comprising an endless chain, a plurality of rolls around which said chain is trained to travel in an endless path, said chain being made up of a series of inside links alternating with a series of outside links having ends overlapping the ends of the inside links and pivotally jointed thereto, elastic rings interposed and tightly compressed between the opposing surfaces of the inside links and the overlapping outside links, said rings surrounding the pivotal axes between said links and forming seals to prevent ingress of foreign material to the pivotal joints, the elasticity of said rings and the degree of compression under which they are held being so correlated with respect to the chain pitch and the size of said rolls as to enable sufficient internal torsional displacement of the ring material within its elastic limit to permit the necessary flexing between the chain links as they pass around said rolls while at the same time preventing slippage between the contacting faces of the rings and the links.

2. A chain mechanism comprising an endless chain, guide means around which said chain is trained to cause said chain to travel in an endless path, said chain being made up of a series of inside links alternating with a series of outside links having ends overlapping the ends of the inside links and pivotally jointed thereto, elastic rings interposed and tightly compressed between the opposing surfaces of the inside links and the overlapping outside links, said rings surrounding the pivotal axes between said links and sealing the pivotal link joints as to retain lubricant therein and prevent foreign material being admitted thereto, there being a correlation between the elasticity of said rings, the degree of compression under which said rings are held as aforesaid and the maximum angle of flexure between adjacent links produced by the travel of said chain about said guide means as to enable sufficient internal torsional displacement of the material of the rings between adjacent links when the latter are flexed relative to each other through the maximum angle produced by said guide means whereby the friction produced by said compression is not overcome and non-slipping contact between said rings and said links is uniformly maintained throughout the operation of said chain over said path.

JAMES M. HAIT.